United States Patent
Lee

Patent Number: 6,038,510
Date of Patent: Mar. 14, 2000

[54] METHOD FOR DISPLAYING CURRENT POSITION OF MOVING OBJECT IN NAVIGATION DEVICE IN ACCORDANCE WITH POSITION CONDITION OF MOVING OBJECT

[75] Inventor: Ho-Seok Lee, Suwon, Rep. of Korea

[73] Assignee: Samsung Electronics Co., Ltd., Kyungki-Do, Rep. of Korea

[21] Appl. No.: 08/867,458

[22] Filed: Jun. 2, 1997

[30] Foreign Application Priority Data

Aug. 8, 1996 [KR] Rep. of Korea ............ 96-33074

[51] Int. Cl.[7] ................................. G06F 165/00
[52] U.S. Cl. ................ 701/213; 701/211; 701/207; 701/208; 701/200; 701/214
[58] Field of Search ................ 701/213, 211, 701/207, 208, 214, 200

[56] References Cited

U.S. PATENT DOCUMENTS

| | | | |
|---|---|---|---|
| 5,345,388 | 9/1994 | Kashiwazaki | 701/213 |
| 5,404,307 | 4/1995 | Odagawa | 701/221 |
| 5,657,232 | 8/1997 | Ishikawa et al. | 701/215 |
| 5,731,978 | 3/1998 | Tamai et al. | |
| 5,774,826 | 6/1998 | McBride | 701/207 |
| 5,828,987 | 10/1998 | Tano et al. | 702/150 |
| 5,867,804 | 2/1999 | Pilley et al. | 701/120 |
| 5,884,219 | 3/1999 | Curtwright et al. | 701/213 |

*Primary Examiner*—William A. Cuchlinski, Jr.
*Assistant Examiner*—Olga Hernandez
*Attorney, Agent, or Firm*—Sughrue, Mion, Zinn, Macpeak & Seas, PLLC

[57] ABSTRACT

A method for displaying a current position of a moving object such that the indication of the moving object when the moving object is positioned above ground is different from that when the moving object is positioned under ground. The method includes the steps of detecting information about the current position of the moving object obtained from a plurality of satellites included in a global positioning system and detecting data about an azimuth angle of the moving object and a speed of the moving object, analyzing whether the moving object is positioned above ground or under ground, based on the detected information, and displaying the current position of the moving object based on the result of the analysis in such a manner that an indication of the current position of the moving object when the moving object is positioned on the ground is different from that when the moving object is positioned under ground.

7 Claims, 7 Drawing Sheets

METHOD FOR DISPLAYING CURRENT POSITION OF MOVING OBJECT IN NAVIGATION DEVICE IN ACCORDANCE WITH POSITION CONDITION OF MOVING OBJECT

BACKGROUND OF THE INVENTION

1. Field of the Invention

The present invention relates to a communication system provided for moving objects, and more particularly, to a method for displaying the current position of a moving object in a navigation device in accordance with the position condition of the moving object such that the indication of the position when the moving object is positioned on the ground is different from that when the moving object is positioned under the ground.

2. Description of the Related Art

A positioning device including a global positioning system (GPS), which is incorporated in a variety of moving objects such as vessels, aircraft and vehicles, to identify the current position and moving speed of the moving object while determining a movement path of the moving object, is well known. Such a GPS positioning device receives electrical waves, indicative of the latitude, longitude and altitude associated with the current position of a moving object, from a plurality of artificial satellites included in the GPS, thereby computing the current position of the moving object. After the computation, the GPS positioning device provides map information, including the current position of the moving object, to the driver of the moving object in the form of a graph. In other words, such a conventional navigation device indicates the current position of the moving object, which is calculated based on the navigation information received from the artificial satellites, on a map read from an auxiliary memory unit such as a CD-ROM and displayed on a display screen.

The navigation device also indicates the advancing direction of the moving object, the distance between the current position of the moving object and the destination of the moving object, the current speed of the moving object, the movement path of the moving object set by the driver prior to the running of the moving object, information about roads associated with the movement path, and an optimum movement path leading to the destination, etc., thereby providing a variety of information necessary to the running of the moving object to the driver.

However, conventional navigation devices display a running vehicle or moving object on a display screen by the same figure and color whether the running vehicle or moving object is positioned on the ground or under the ground. When the running vehicle or moving object is positioned under ground, it cannot be viewed from the sky because it is shielded by underground roads, elevated roads or buildings. In this case, navigation information from the GPS cannot be accurately received. However, the driver may not be aware that the moving object is underground and therefore the reception of the navigation information is poor.

SUMMARY OF THE INVENTION

Therefore, an object of the present invention is to provide a method for displaying the current position of a moving object in accordance with the position condition of the moving object in such a manner that the indication of the moving object when the moving object is positioned above ground is different from that when the moving object is positioned under ground.

In accordance with the present invention, this object is accomplished through a method for displaying the current position of a moving object based on position information in a navigation device, comprising the steps of: detecting information about the current position of the moving object obtained from a plurality of satellites included in a global positioning system and detecting data corresponding to an azimuth angle of the moving object and a speed of the moving object; and displaying the current position of the moving object based on the detected information and data in such a manner that an indication of the current position of the moving object when the moving object is positioned above ground is different from that when the moving object is positioned under ground.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
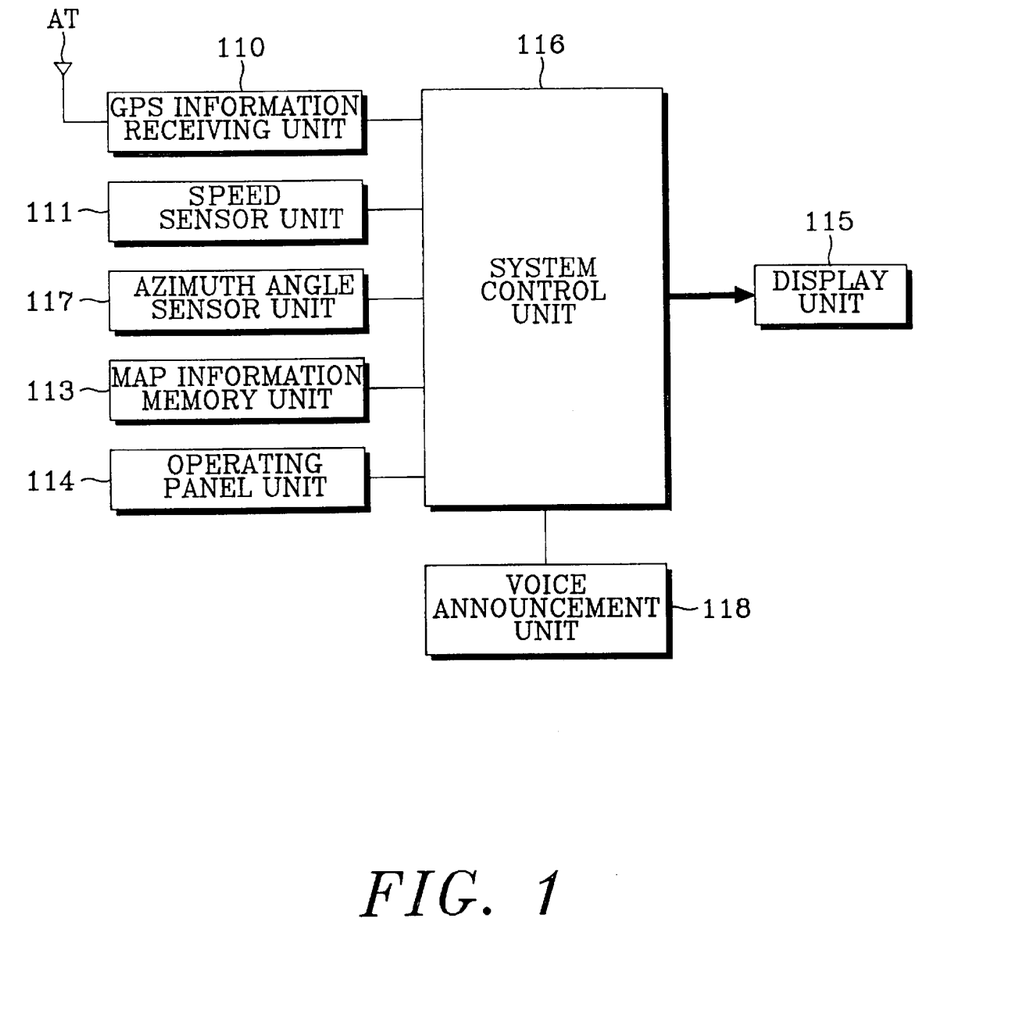
FIG. 1 is a block diagram illustrating a navigation device adapted to carry out a method for displaying the current position of a moving object in accordance with the present invention.

FIG. 1 illustrates a block diagram of a navigation device adapted to carry out a method for displaying the current position of a moving object in accordance with the present invention. As shown in FIG. 1, the navigation device includes a GPS information receiving unit 110 adapted to receive electrical waves from a plurality of artificial satellites included in a GPS via an antenna AT and to calculate pseudo coordinates associated with the current position of a moving object, for example, a running vehicle, based on the received electrical waves. The navigation device also includes a speed sensor unit 111 for sensing the current running speed of the vehicle and for converting the sensed running speed into a pulse or voltage signal, and an azimuth angle sensor unit 117 for sensing the azimuth angle of the vehicle. The azimuth angle sensor unit 117 may be a gyro sensor. The azimuth angle sensor unit 117 senses the azimuth angle of the running vehicle indicative of the advancing direction of the running vehicle and converts the sensed azimuth angle into a pulse or voltage signal.

A map information memory unit 113 is also provided which stores map information and other additional information such as data related to the position and azimuth angle of the moving object. The navigation device further includes an operating panel unit 114 having a plurality of keys including various identifying buttons and numeric keys and serving to input various commands (for example, displaying of navigation information) from the driver of the vehicle. A display unit 115 displays map information read from the map information memory unit 113 along with various conditions occurring in accordance with operations of the navigation device, and a voice announcement unit 118 outputs announcement information about a movement path associated with the vehicle in the form of voice. A system control unit 116 is also provided which may have a position computation function. Such a position computation function may be externally provided. In accordance with the position computation function, the system control unit 116 computes a pseudo current position of the vehicle based on data representing the azimuth angle and speed of the vehicle received from the speed and azimuth angle sensor units 111 and 117. The system control unit 116 then selects the pseudo coordinates of the current vehicle position received from the GPS information receiving unit 110 or the calculated pseudo current vehicle position or combines them, thereby calculating the current position of the vehicle as well as information about the running of the vehicle such as information about the speed and advancing direction of the vehicle. The system control unit 116 includes various input/output ports, for example, including a GPS information receiving port, a key input port, and a display unit control port, etc. The system control unit 116 controls the entire operation of the navigation device associated with the navigation while controlling the display unit 115 to display announcement information about running paths associated with the vehicle on a map including areas in the vicinity of the vehicle. The system control unit 116 also controls the voice announcement unit 118 to output the announcement information in the form of voice.

Figure 2:
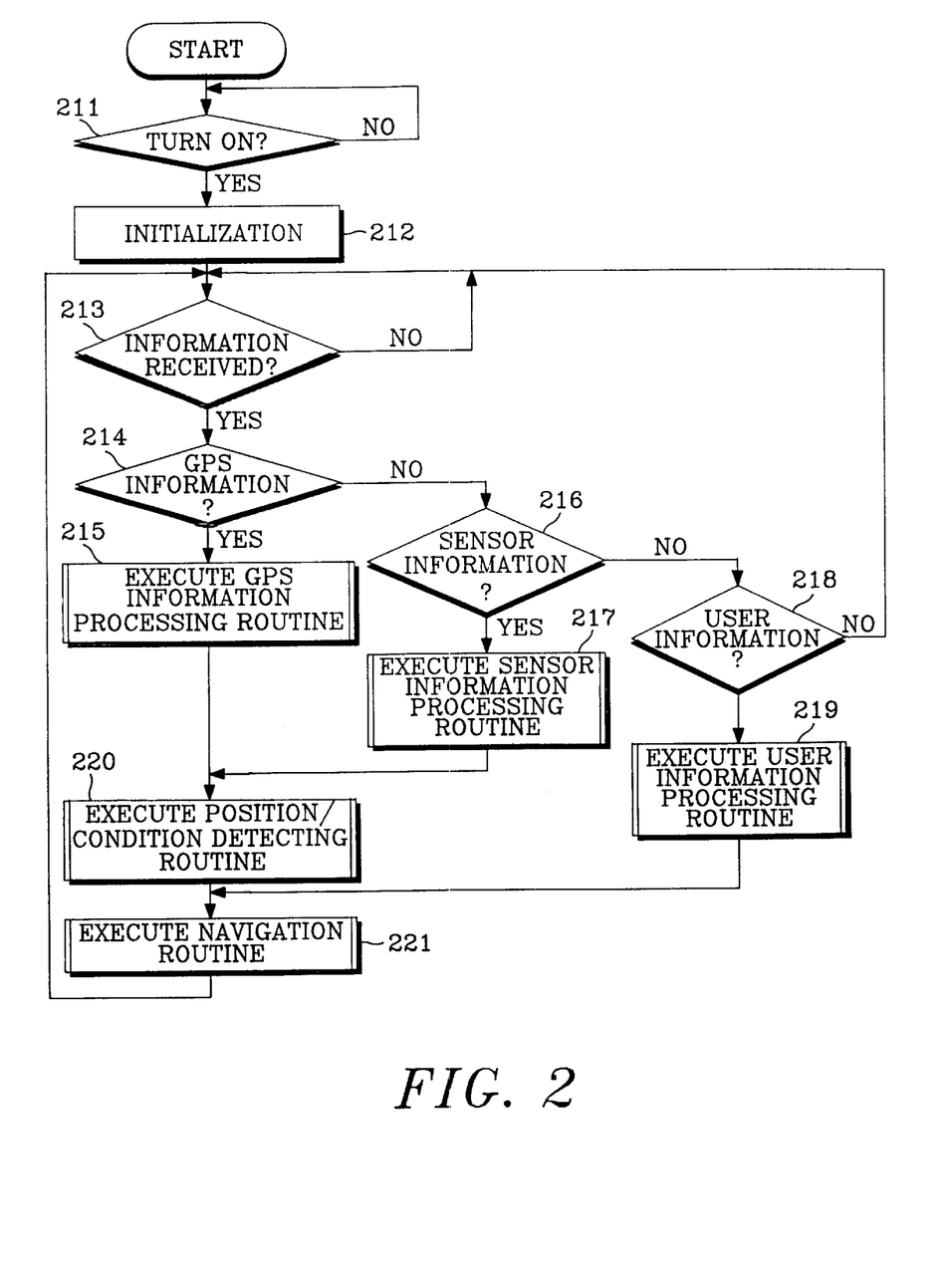
FIG. 2 is a flow chart illustrating a conventional control procedure for detecting navigation information in the navigation device shown in FIG. 1.

FIG. 2 is a flow chart illustrating a conventional control procedure for detecting navigation information in the navigation device shown in FIG. 1. In accordance with this control procedure, the system control unit 116 supplies electric power to external interfaces when the navigation device turns on at step 211. The system control unit 116 also initializes the information storing area of the map information memory unit 113 while controlling the display unit 115 to display an initialized GPS picture. At step 213, the system control unit 116 then receives information such as GPS information, sensor information or user information from the operating panel unit 114. When receiving GPS information at step 214, the system control unit 116 executes a GPS information processing routine at step 215. When receiving sensor information at step 216, the system control unit 116 executes a sensor information processing routine at step 217. When receiving user information at step 218, the system control unit 116 executes a user information processing routine at step 219. The input information may be individually processed in the GPS information processing routine, sensor information processing routine and user information processing routine. Alternatively, at least two pieces of information may be used in a combined state. At step 220, the system control unit 116 executes a routine for calculating the current position of the vehicle and the position condition of the vehicle by use of the processed GPS information, and sensor information, thereby detecting position information. Thereafter, the system control unit 116 executes a navigation routine by use of the position information, user information and other stored information calculated at step 221. After executing step 221, the procedure returns to step 213.

Figure 3:
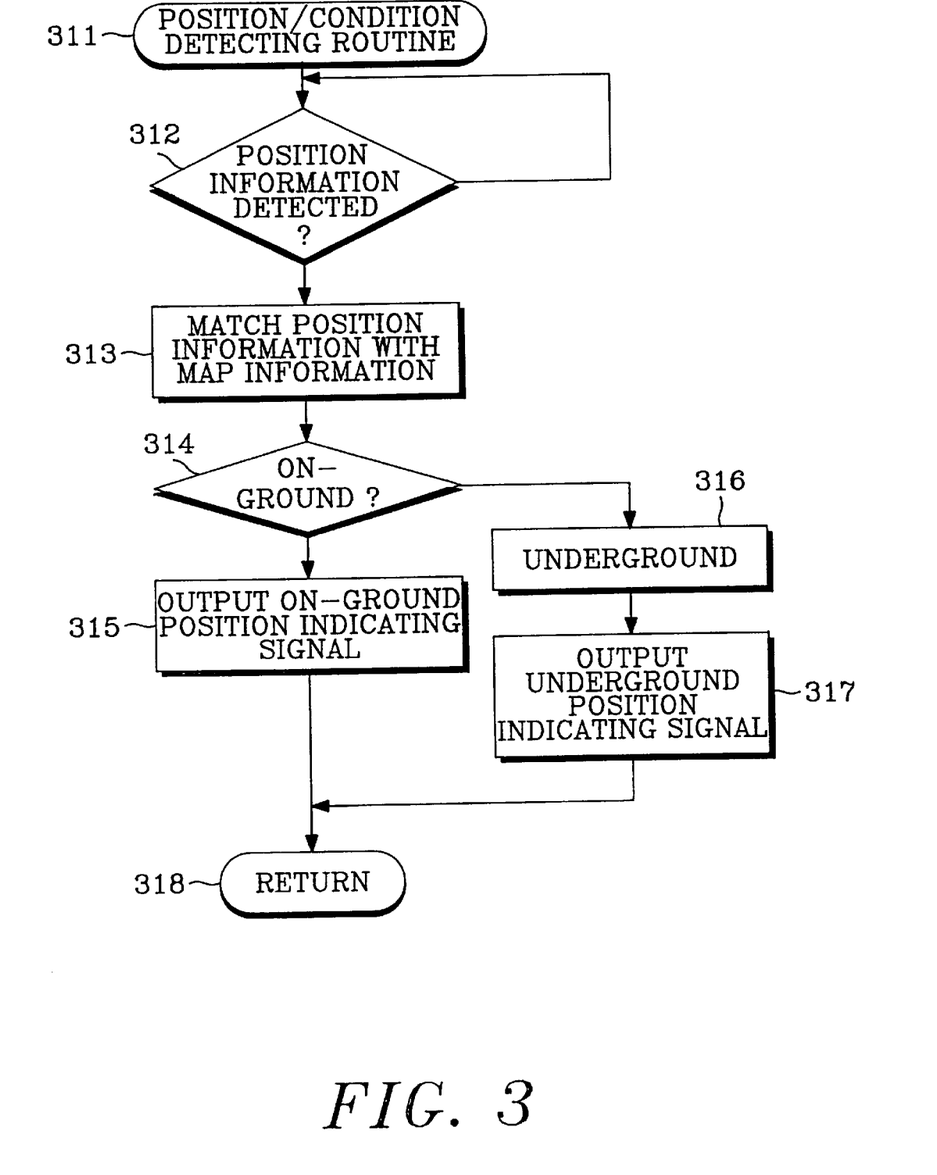
FIG. 3 is a flow chart illustrating a procedure for discriminating the current position of a moving object and displaying the discriminated current position of the moving object in accordance with the present invention.

FIG. 3 is a flow chart illustrating a procedure for discriminating the current position of a moving object and displaying the discriminated current position of the moving object in accordance with the present invention. In accordance with this procedure, a position/condition detecting routine is first executed at step 311. For the execution of the position/condition detecting routine, a position computing unit, which is included in the system control unit 116, first calculates the current position of a moving object, for example, a running vehicle, based on GPS information received from the GPS information receiving unit 110 and sensor information received from the speed and azimuth angle sensor units 111 and 117, thereby detecting position information about the current position of the vehicle (Step 312). Using the position information, the system control unit 116 calculates information about which map and which area of the map correspond to the current position of the running vehicle. The system control unit 116 then matches the calculated information with map information stored in the map information memory unit 113 and displays the current position of the running vehicle and the position condition of the vehicle based on the resultant information (Step 313). In this case, the system control unit 116 can discriminate whether the vehicle is positioned above ground or under ground, using the map information at steps 314 and 316.

The map data is used to determine whether the moving object is positioned above ground level or below ground level. That is, the map data related to the position and the azimuth data are used to determine whether the moving object is positioned above ground level or below ground level. The map data may include a road, a configuration of the ground, etc. When it is discriminated at step 314 that the vehicle is positioned on the ground, the system control unit 116 applies an on-ground display signal to the display unit 115, thereby causing the display unit 115 to display an indication corresponding to the on-ground position (Step 315). When it is discriminated at step 316 that the vehicle is positioned under ground, the system control unit 116 applies an underground display signal to the display unit 115, so that the display unit 115 displays an indication corresponding to the underground position (Step 317).

Figure 4A:
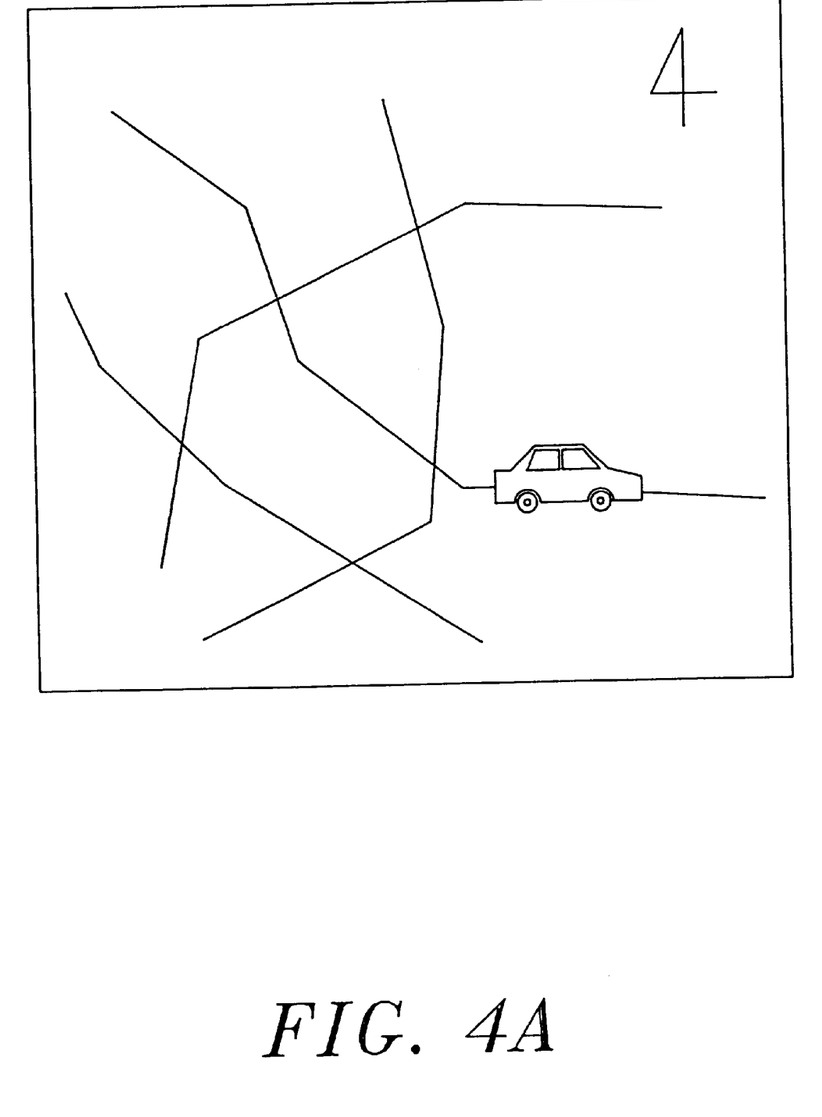
FIG. 4A is a schematic view illustrating an indication indicative of the position condition of a moving object when the moving object is positioned above ground in accordance with a first embodiment of the present invention.
Figure 4B:
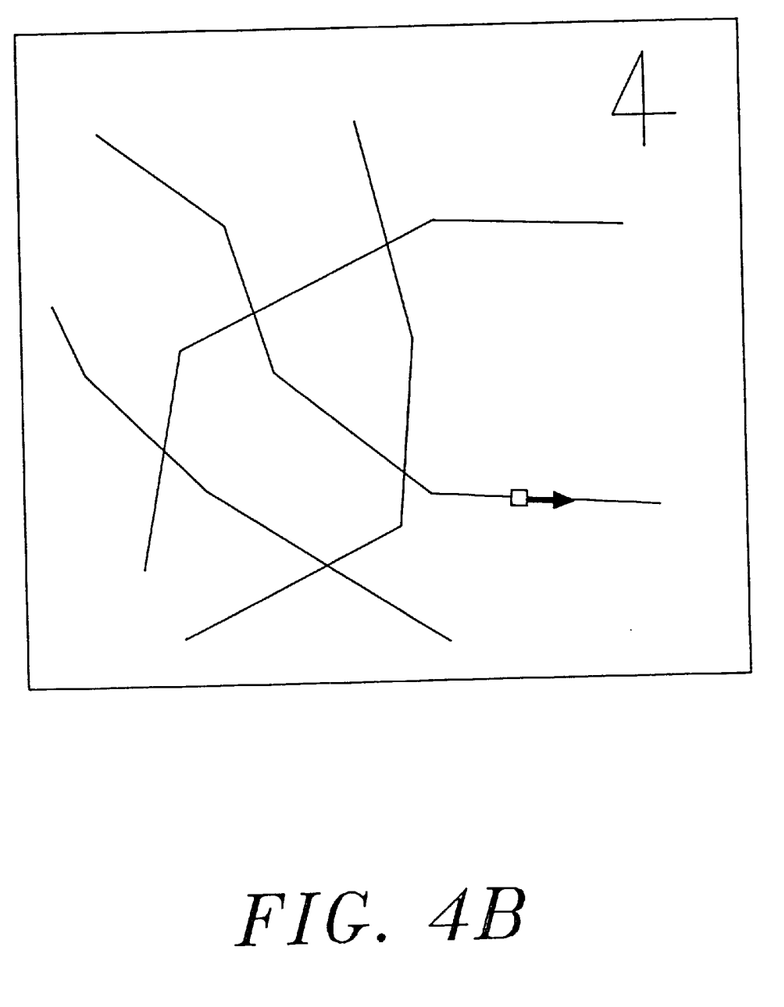
FIG. 4B is a schematic view illustrating an indication indicative of the position condition of the moving object when the moving object is positioned under ground in accordance with the first embodiment of the present invention.

FIGS. 4A and 4B illustrate indications of the position condition of a running vehicle in accordance with a first embodiment of the present invention. FIG. 4A shows an indication displayed on the display unit 115 when the running vehicle is positioned on the ground, whereas FIG. 4B shows an indication displayed when the running vehicle is positioned under ground. Referring to FIGS. 4A and 4B, it can be found that the indication displayed when the running vehicle is positioned on the ground is different from that displayed when the running vehicle is positioned under ground. That is, the vehicle is shown by different figures in the two different cases, respectively, so that the driver can sense the difference between the on-ground and underground positions.

Figure 5A:
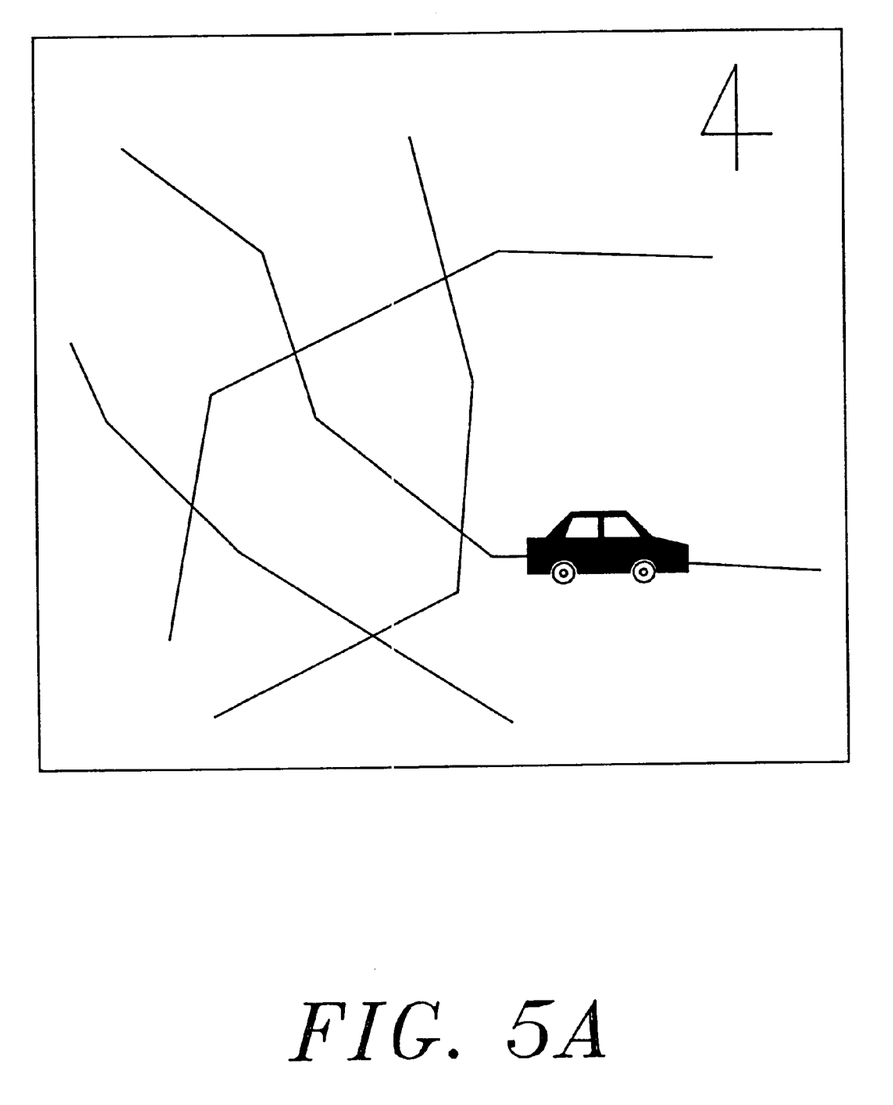
FIG. 5A is a schematic view illustrating an indication of the position condition of a moving object when the moving object is positioned above ground in accordance with a second embodiment of the present invention.
Figure 5B:
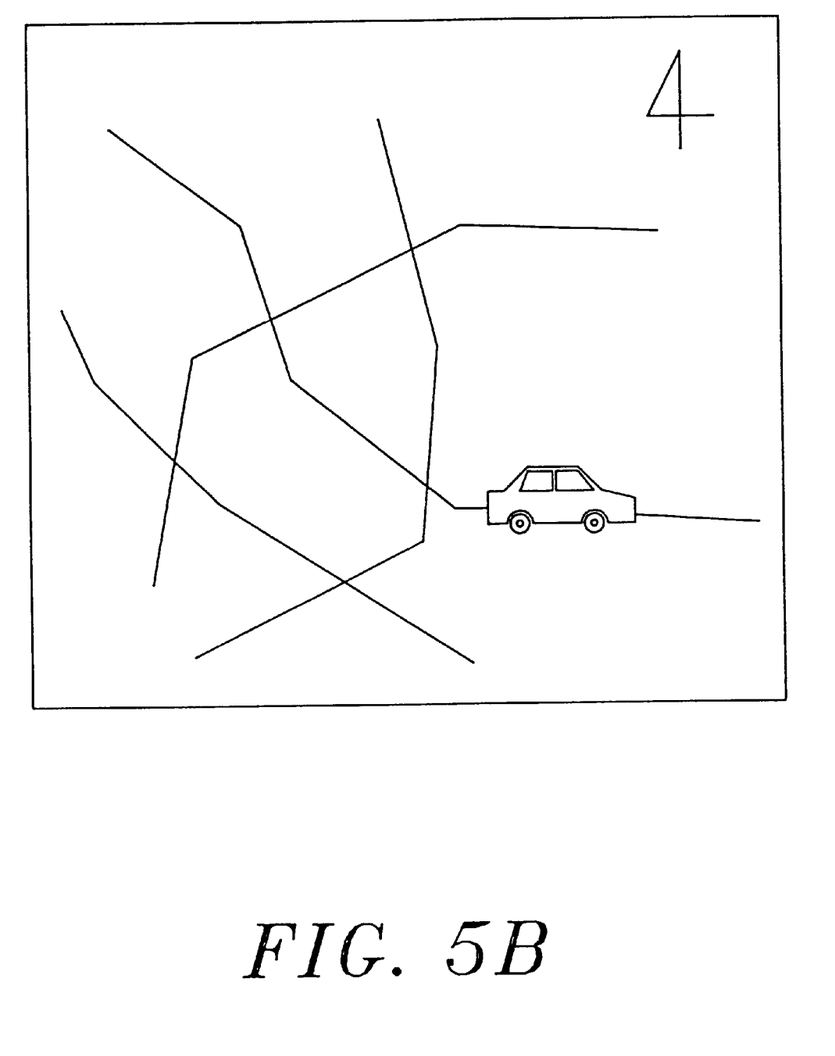
FIG. 5B is a schematic view illustrating an indication indicative of the position condition of the moving object when the moving object is positioned under ground in accordance with the second embodiment of the present invention.

On the other hand, FIGS. 5A and 5B illustrate indications of the position condition of a running vehicle in accordance with a first embodiment of the present invention. FIG. 5A shows an indication displayed on the display unit 115 when the running vehicle is positioned on the ground, whereas FIG. 5B shows an indication displayed when the running vehicle is positioned under ground. Referring to FIGS. 5A and 5B, it can be found that the indication displayed when the running vehicle is positioned on the ground is different in color from that displayed when the running vehicle is positioned under ground.

As is apparent from the above description, the present invention provides a method for displaying the current position of a moving object in accordance with the condition of the current position of the moving object in such a manner that the indication of the moving object when it is positioned on or above ground is different in figure or color from that when it is positioned under ground. Accordingly, the driver of the moving object can realize the reason why the condition of receiving navigation information from a GPS is bad. It is also possible to rapidly and accurately detect the current position condition of the moving object.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for displaying a current position of a moving object based on position information in a navigation device, comprising the steps of:

detecting information corresponding to the current position of said moving object from a plurality of satellites included in a global positioning system;

detecting data representing an azimuth angle of said moving object and a speed of said moving object; and displaying the current position of said moving object based on detected information and data wherein an indication of the current position of said moving object output when said moving object is positioned above ground level is different from an indication output when said moving object is positioned under ground level.

2. The method according to claim 1, wherein said displaying step comprises the steps of:

displaying said indication of the current position of said moving object in a first color when said moving object is above ground level; and displaying said indication of the current position of said moving object in a second color, different from said first color, when said moving object is under ground level.

3. The method according to claim 1, wherein said displaying step comprises the steps of:

displaying said indication as a first symbol when said moving object is above ground level; and displaying said indication as a second symbol, different from said first symbol, when said moving object is under ground level.

4. A method for displaying a current position of a moving object based on position information in a navigation device, comprising the steps of:

detecting information corresponding to the current position of said moving object obtained from a plurality of satellites included in a global positioning system;

detecting data representing an azimuth angle of said moving object and a speed of said moving object;

analyzing whether said moving object is positioned above ground level or under ground level, based on detected information; and displaying the current position of said moving object based on a result of said analysis wherein an indication of the current position of said moving object output when said moving object is positioned above ground level is different from an indication output when said moving object is positioned under ground level.

5. The method according to claim 4, wherein said displaying step comprises the steps of:

displaying said indication of the current position of said moving object in a first color when said moving object is above ground level; and displaying said indication of the current position of said moving object in a second color, different from said first color, when said moving object is under ground level.

6. The method according to claim 4, wherein said displaying step comprises the steps of:

displaying said indication as a first symbol when said moving object is above ground level; and displaying said indication as a second symbol, different from said first symbol, when said moving object is under ground level.

7. The method according to claim 4, wherein said analyzing step comprises the step of comparing said detected information and said detected data with map information.

* * * * *